Nov. 1, 1932.    W. A. LOMBARDI    1,885,120
CHOCKING DEVICE FOR AUTOMOBILES AND AEROPLANES
Filed June 20, 1930    2 Sheets-Sheet 1
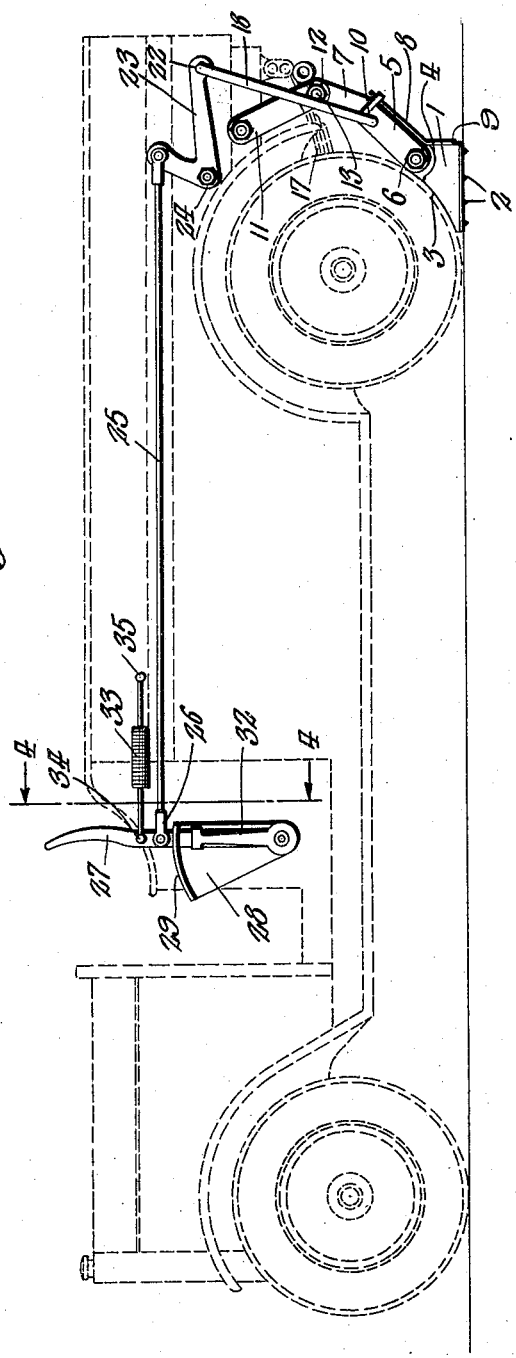
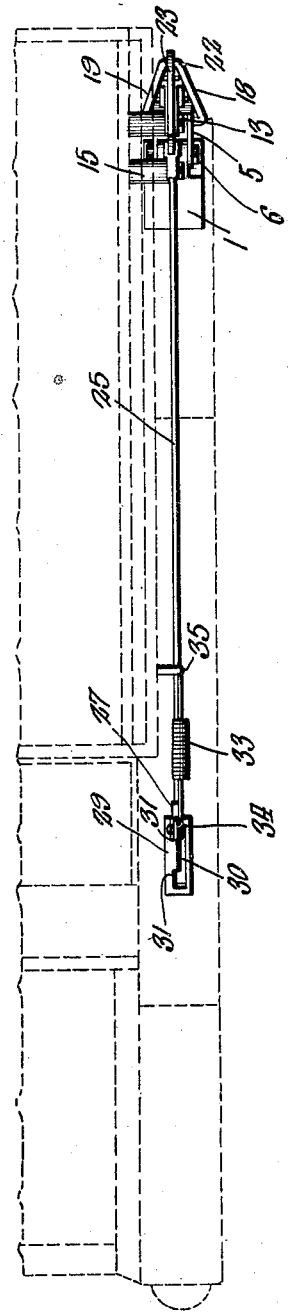
William A. Lombardi,
INVENTOR
BY Victor J. Evans
ATTORNEY Nov. 1, 1932.  W. A. LOMBARDI  1,885,120
CHOCKING DEVICE FOR AUTOMOBILES AND AEROPLANES
Filed June 20, 1930    2 Sheets-Sheet 2
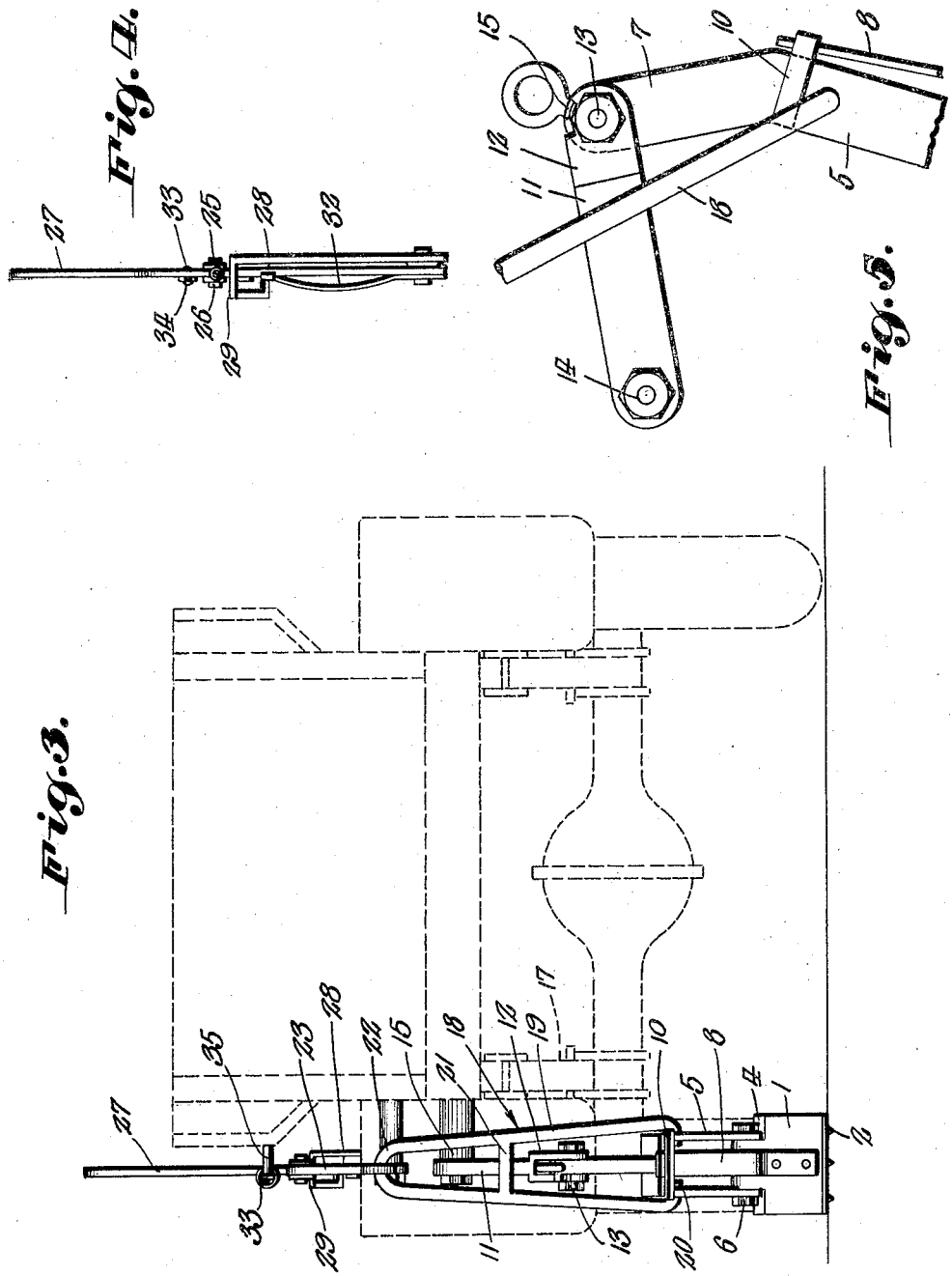

Patented Nov. 1, 1932

1,885,120

UNITED STATES PATENT OFFICE

WILLIAM A. LOMBARDI, OF EAST STROUDSBURG, PENNSYLVANIA

CHOCKING DEVICE FOR AUTOMOBILES AND AEROPLANES

Application filed June 20, 1930. Serial No. 462,630.

This invention relates to a chocking device designed particularly for use on automobile trucks and aeroplanes, and the primary object of the invention is to provide a means for chocking one of the rear wheels of a truck so as to prevent movement of the truck when it is required to insure of the same remaining stationary.

Another object of the invention is to provide a novel form of chocking or wedge member which will firmly engage the road surface and having wedging engagement about the same and the rear wheel with which it is associated, so that rotation of the wheel will be effectually prevented when the chocking member is in active position.

Another object of the invention is to provide means for adjusting the chocking member so that it may be elevated to an inactive position, and means for automatically rendering the first mentioned means inactive and for, at the same time, actuating the same to move the chocking member to active position, so that, in case of emergency, it is unnecessary for the operator of the automobile to manually rock a lever by which such adjustment is effected, it being only necessary, in accordance with the principles of the invention to displace the lever from engagement with the retaining means, and the invention contemplating the connection with the lever of a spring constituting a means for automatically swinging the lever in a direction to render the chock active.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 1 is a view in side elevation of a chocking device embodying the invention.

Figure 2 is a top plan view thereof.

Figure 3 is a view in rear elevation of the device.

Figure 4 is a vertical transverse sectional view on the line 4—4 of Figure 1 illustrating the lever and the parts with which it is associated, in elevation.

Figure 5 is a fragmentary side elevation of a portion of the means provided for supporting the chock.

The chock of the invention is indicated in general by the numeral 1 and this chock comprises a body which is preferably of cast metal and is provided upon its under side with a plurality of spurs or corrugations 2 for insuring of fixed and firm engagement of the chock with the road surface. The chock is preferably provided with a vertical or straight rear side and at its forward side is curved as indicated by the numeral 3 so as to conform to the curvature of the rear tire in connection with which the chocking device is to be employed. At its upper portion and in each side, the chock body 1 is cut away to provide recesses 4, and the parallel sides 5 of an inverted U-shaped member are pivotally connected to the block, at their lower ends, in these recesses, by a single bolt or an individual bolt for each link, indicated by the numeral 6. Projecting upwardly from the ends of the U-shaped member is an arm 7 which is slightly inclined forwardly, and pivotally connected with the yoke-like extremity 12 of a link 11. A leaf spring 8 is secured by riveting or otherwise, at its end to the flat rear side of the chock as indicated by the numeral 9 and this leaf spring extends upwardly at the rear sides of the U-shaped member, and the parallel sides thereof are preferably connected by an offset cross piece 10 which at its rear side is spaced from said member, and the upper portion of the spring 8 is received thereby, the tendency of the spring being to swing the chock 1 about the pivot 6 so that it will assume the proper position to engage the ground surface when it is brought into active position.

A pivot pin 13 is fitted through the yoke and through the upper ends of the said portions of the parallel sides of said member.

At its forward end, the link 11 is pivotally connected with a stub shaft 15 which is mounted upon one side of the body or chassis of the truck. A frame, indicated in general by the numeral 18 and of the form shown in Figure 3 of the drawings, includes downwardly diverging side members 19 which are provided with inturned ends 20 to engage in openings in the parallel sides 5, and the said side portions 19 are preferably braced, intermediate their upper and lower ends by an integral cross brace indicated by the numeral 21 and are connected, at their upper ends, by a bend 22 with which is pivotally connected one arm 23 of an angle lever mounted for rocking movement upon the side of the body of the automobile as at 24, the other arm of the angle lever having connected to it the rear end of a connecting rod 25 which leads forwardly beside the body of the automobile and is pivotally connected at its forward end as at 26 to a hand lever 27.

A rack member 28 of segmental form is mounted beside the hand lever and the outstanding arcuate flange 29 at the upper end of the rack member 28 is formed with a longitudinally extending slot 30 one wall of which is formed, at its ends, with notches 31, and the hand lever 27 works in the slot 30 and, by a spring 32, which is movable with the lever and which bears against the lever at a point above its pivot, the lever is held yieldably in engagement with the side wall of the slot 30 in which the notches 31 are formed. At this point it will be understood that when the lever is swung to the position shown in Figure 1 of the drawings, it will engage in the rear one of the notches 31 and, when lateral pressure is exerted against the lever, against the tension of the spring 32, the lever may be swung in a forward direction until engaged in the notch 31 at the forward end of the slot 30 whereupon the chock 1 will be elevated to inactive position. As previously stated, the invention contemplates the provision of means for automatically moving the lever to effect return movement of the chock to its active position and this means comprises a tension spring 33 which is connected at one end as at 34, to the lever 27 and at its other end as at 35 to the adjacent side of the body of the automobile, and it will be evident by reference to Figures 1 and 2 of the drawings that when the lever 27 is swung forwardly to move the chock 1 to inactive position, such movement of the lever is against the tension of the spring 33, but inasmuch as the lever will, at this time, be engaged in the forward one of the notches 31, the lever will remain stationary.

When it is desired to have the chock moved downwardly to active position, it is only necessary for the operator of the automobile or aeroplane to displace the lever laterally until it disengages from the said notch, whereupon the spring 33 will automatically swing the lever rearwardly until it is engaged in the rear one of the notches 31, and at this time the arm 23 will be rocked and a downward thrust will be exerted upon the frame 18 so as to swing the link 5 in a forward direction and project the forward end of the chock 1 between the lower side of the rear wheel and the road surface.

What I claim is:—

1. In a chocking device for vehicles, a shoe having a curved upper surface, an inverted U-shaped member having its parallel sides pivotally connected with the chock at their lower ends, an arm rising from said member and slightly inclined forwardly, a link having a yoke-like extremity pivotally connected with the upper end of said arm and pivotally mounted on the vehicle, and means for operating the device including a manually controlled lever, and an operative connection between the lever and said U-shaped member.

2. In a chocking device for vehicles, a shoe, an inverted U-shaped member having its parallel sides pivoted at their lower ends to said shoe, an arm rising from said member and inclined with relation thereto, a link having a yoke-like extremity pivotally connected with the upper end of the arm, and pivotally mounted at its other end on the vehicle, a bell crank lever disposed above the link, a frame pivotally connected with the U-shaped member and with one branch of the bell crank lever, and means for operating said bell crank lever from a remote point.

3. In a chocking device for vehicles, a shoe, an inverted U-shaped member having its parallel sides pivoted at their lower ends to said shoe, an offset cross piece connecting said parallel sides, a leaf spring connected with the shoe, and having its free extremity received by the cross piece, an arm rising from the U-shaped member, a link pivoted on said vehicle and having a yoke-like extremity pivotally connected with the adjacent end of said arm, a bell crank lever pivoted above the link, a frame depending from one branch of the bell crank lever and connected with the U-shaped member, and means for operating the bell crank lever from a remote point.

In testimony whereof I affix my signature.

WILLIAM A. LOMBARDI.